C. CARTER.
Coated Compressed Medicaments.
No. 207,013.      Patented Aug. 13, 1878
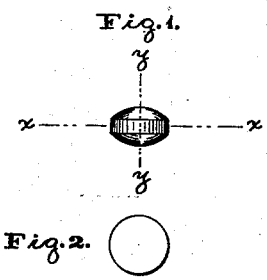
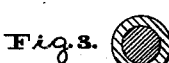
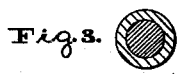
Witnesses:
A. P. Grant
W. F. Kircher
Inventor:
Chas. Carter,
by John A. Wiedersheim
ATTORNEY.

UNITED STATES PATENT OFFICE.

CHARLES CARTER, OF PHILADELPHIA, PENNSYLVANIA.

IMPROVEMENT IN COATED COMPRESSED MEDICAMENTS.

Specification forming part of Letters Patent No. 207,013, dated August 13, 1878; application filed April 2, 1878.

*To all whom it may concern:*

Be it known that I, CHARLES CARTER, of the city and county of Philadelphia, and State of Pennsylvania, have invented a new and useful Improvement in Coated Compressed Medicaments, &c., which improvement is fully set forth in the following specification and accompanying drawings, in which—

Figure 1 is a side elevation. Fig. 2 is a plan view. Fig. 3 is a section in line *x x*, Fig. 1. Fig. 4 is a section in line *y y*, Fig. 1.

Similar letters of reference indicate corresponding parts in the several figures.

My invention consists in the hereinafter-described improvement in the manufacture of coated compressed medicaments, the same consisting in partially enveloping the medicaments in coverings of a saccharine nature in the form of powder, and then applying a top or finishing covering of powder, and compressing the whole, so that the powder covering holds by cohesion, thus producing a seamless coated compressed medicament, substantially as described.

In carrying out my invention, I take a quantity or dose of the medicament and completely envelope it in a covering of sugar or equivalent material, prepared in any desirable manner, and then subject the whole to pressure, substantially as hereinafter more fully described.

It will be seen that the inclosed substances are preserved so as not to be affected by time or changes of temperature, climate, and season, and, if they are unpleasant to the senses, they are disguised, and may be readily swallowed without nausea, and also without inconvenience, as the size of the complete article is reduced, the solubility of the same in the digestive organs being in nowise prevented.

In the manufacture of the compressed coated article heat is not necessarily employed, as the coating and the compression may be accomplished at ordinary temperature.

The inclosed substance may be in the form of liquid, powder, paste, mass, or solid, and the covering composed of sugar or other similar material, and in a powdered condition.

In furtherance of the above, a suitable quantity of sugar, in powder, at ordinary temperature, and of ordinary degree of moisture of the atmosphere, is placed in the bottom of a compressing apparatus. The substance to be coated, if of a solid condition, is then introduced upon the sugar, sufficient space being allowed between the substance and the wall of the apparatus, as well as the upper part thereof, to permit the admission of surrounding or top-closing sugar, which being applied, the compressing-force is exerted, so that the particles of sugar are made to cohere and become solid, whereby, when the article is removed from the apparatus, the inclosed substance is completely and densely covered.

When a substance in condition of liquid or powder is to be covered or coated by compression, it may become necessary to modify the process by combining with the sugar a mucilage, gum, or other harmless adhesive material. A depression is made in the coating material of size to insert the substance in the condition just stated, the upper part whereof is closed with some of the coating material, and the whole subjected to sufficient compression.

I am aware that it is not new to cover medicaments, confectionery, &c., with sugar, gelatine, and other bland materials, and that compressed and coated pills are not new; but I am not aware that any substance has been covered or coated by compression in a manner hereinbefore stated and with the results set forth.

Heat has been employed as a medium of coating, and the want of ready solubility of the product thereof is an objection to the use of the latter, which is overcome by my cold process, and, as several other advantages are presented, as has been stated, I believe that I have made an improvement in the art.

I am also aware that capsules have been before formed by gluing together concave disks of wafer, inside of which were placed proper medicaments; but in such case the disks formed the shell of the capsule.

In my invention a suitable mold or die, being coated with dry powdered sugar, or other similar material, on its inner surface, receives the medicament, and, compression being applied after a top coating or covering has been placed thereon, the sugar coheres to the compressed article.

What I claim as my invention is—

1. The herein-described improvement in the manufacture of coated compressed medicaments, the same consisting in partially enveloping the medicaments in coverings of a saccharine nature in the form of powder, and then applying a top or finishing covering of powder, and compressing the whole, so that the powder covering holds by cohesion, thus producing a seamless coated compressed medicament, substantially as described.

2. As a new article of manufacture, a compressed pill having a compressed seamless coating of powdered sugar or like substance, substantially as herein specified.

CHARLES CARTER.

Witnesses:
JOHN A. WIEDERSHEIM,
A. P. GRANT.